US012717884B2

(12) United States Patent
Erickson et al.

(10) Patent No.: US 12,717,884 B2
(45) Date of Patent: Aug. 25, 2026

(54) PROACTIVE BIOMETRIC SIGNATURE GENERATION

(71) Applicant: Capital One Services, LLC, McLean, VA (US)

(72) Inventors: Austin Erickson, Herndon, VA (US); Michael Mossoba, Great Falls, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 309 days.

(21) Appl. No.: 18/053,286

(22) Filed: Nov. 7, 2022

(65) Prior Publication Data

US 2024/0152587 A1 May 9, 2024

(51) Int. Cl.
*G06F 21/32* (2013.01)

(52) U.S. Cl.
CPC .................................... *G06F 21/32* (2013.01)

(58) Field of Classification Search
CPC ...................................................... G06F 21/32
See application file for complete search history.

(56) References Cited

U.S. PATENT DOCUMENTS

2001/0034836 A1* 10/2001 Matsumoto ........... H04L 9/3231 713/176
2017/0193214 A1* 7/2017 Shim ..................... H04W 12/02
2018/0004924 A1* 1/2018 Tieu ..................... G06F 21/6218
2018/0157815 A1* 6/2018 Salama ................ H04N 23/661
2020/0082062 A1* 3/2020 Mequanint .............. G06F 21/44
2020/0334345 A1* 10/2020 Young ...................... G06F 21/32
2021/0264006 A1* 8/2021 VanBlon ................. G06F 21/45
2022/0067132 A1* 3/2022 Learmonth .......... G06V 40/161
2022/0124089 A1* 4/2022 Regalado ............ H04W 12/062
2022/0277070 A1* 9/2022 Robert Jose ............ G06F 21/45
2023/0143293 A1* 5/2023 Sanchez ................ H04L 9/3231 713/186
2024/0028698 A1* 1/2024 Kane ........................ G06N 3/04

* cited by examiner

*Primary Examiner* — Trong H Nguyen
*Assistant Examiner* — Samikshya Poudel
(74) *Attorney, Agent, or Firm* — Banner & Witcoff, Ltd.

(57) ABSTRACT

Systems, methods, and apparatuses for proactive generation of biometric signatures are described. Based on a first biometric signature matching a first authenticated signature, an indication of portions of the biometric input that will be different after a second time may be generated. A second authenticated signature based on the indication and the biometric input received at the first time may be generated. A second biometric signature based on the indication and the biometric input received after a second time may be generated. Based on the second biometric signature matching the second authenticated signature, a prompt requesting authorization to generate a third authenticated signature based on the biometric input received after the second time may be generated. Based on receiving authorization to generate a third authenticated signature, a third authenticated signature may be generated.

20 Claims, 8 Drawing Sheets

PROACTIVE BIOMETRIC SIGNATURE GENERATION

FIELD OF USE

Aspects of the disclosure relate generally to the automatic generation of biometric signatures. More specifically, aspects of the disclosure provide for the automatic generation of authenticated biometric signatures based on biometric input and indications of portions of the biometric input that may be different at a future time.

BACKGROUND

Biometric inputs such as fingerprints may be used to control access to a wide variety of things including physical areas (e.g., biometric door locks), devices (e.g., smartphone unlocking), and electronic accounts such as bank accounts or e-mail accounts. To maintain security and prevent unauthorized access it is important that the biometric signature associated with a biometric input be up to date and that effective protocols exist in the event that a biometric input is compromised, expires, or becomes invalid for some other reason. Current protocols for updating or renewing biometric signatures may take various forms. For example, one way of addressing an expired biometric signature is by contacting a user via some form of communication such as e-mail and requesting that the user validate their identity by some non-biometric method. Once a user's identity has been confirmed, the user may be allowed to generate a new biometric signature. However, validating the identify of the user in this way may not be entirely secure.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may address the aforementioned problems and other problems, and generally improve the effectiveness and security of biometric signatures and associated biometric inputs.

Aspects described herein may allow for automatic methods, systems, and apparatuses to generate a biometric signature based on indications of anticipated changes in the biometric input on which the biometric signature is based. This may have the effect of improving overall security including the security of access to devices, physical locations, user accounts, and other information that may be accessed through use of a biometric input that is authenticated against an authenticated biometric signature. By proactively indicating portions of a biometric input that may be different in the future, and the time frame in which the differences will become manifest, the biometric signature based on the biometric input may be proactively generated in advance of the anticipated changes to the biometric input.

More particularly, some aspects described herein may provide a computer-implemented method for generating a biometric signature. The computer-implemented method may comprise generating, by a computing device, a first biometric signature based on a biometric input received at a first time. The computer-implemented method may comprise, based on the first biometric signature matching a first authenticated signature, receiving an indication of one or more portions of the biometric input received at the first time that will be different after a second time. The computer-implemented method may comprise generating a second authenticated signature based on the biometric input received at the first time and the indication of the one or more portions of the biometric input received at the first time that will be different after the second time. The computer-implemented method may comprise receiving a biometric input after the second time. The computer-implemented method may comprise generating a second biometric signature based on the biometric input received after the second time and the indication of the one or more portions of the biometric input received at the first time that will be different after the second time. The computer-implemented method may comprise based on the second biometric signature matching the second authenticated signature, generating a prompt requesting authorization to generate a third authenticated signature based on the biometric input received after the second time. Furthermore, the computer-implemented method may comprise, based on receiving the authorization to generate the third authenticated signature, generating the third authenticated signature based on the biometric input received after the second time.

According to some aspects described herein, the computer-implemented method may comprise determining that the third authenticated signature will be used for authentication. Further, the computer-implemented method may comprise determining that the first authenticated signature and the second authenticated signature will not be used for authentication.

According to some aspects described herein, the computer-implemented method may comprise sending a notification to a user that is a source of the biometric input received at the first time, wherein the notification is sent after the first time and before the second time, and wherein the notification indicates that the biometric input received at the first time will no longer be authenticatable after the second time.

According to some aspects described herein, the computer-implemented method may comprise receiving event data comprising a time of an event associated with a change to the biometric input that will result in the one or more portions of the biometric input received at the first time being different after the second time. Further, the computer-implemented method may comprise determining that the second time is based on the time of the event associated with the change to the biometric input.

According to some aspects described herein, the event data may be received from a calendar application of a user that is a source of the biometric input.

According to some aspects described herein, the computer-implemented method may comprise sending a notification requesting a user that is a source of the biometric input to provide a biometric input to generate the second authenticated signature before the time of the event associated with the change to the biometric input.

According to some aspects described herein, the computer-implemented method may comprise based on the second biometric signature not matching the second authenticated signature, not authenticating the biometric input received after the second time. Further, the computer-implemented method may comprise sending a notification indicating an unsuccessful authentication attempt to a user that is a source of the biometric input received at the first time.

According to some aspects described herein, the indication of the one or more portions of the biometric input received at the first time that will be different after the second time comprise one or more changes to a geometry of a face of a user that is a source of the biometric input.

According to some aspects described herein, the one or more changes to the geometry of the face comprise a nasal shape change, an eye shape change, a chin shape change, a cheek shape change, a hairline shape change, or a lip shape change.

According to some aspects described herein, the computer-implemented method may comprise receiving an indication of the second time. Further, the computer-implemented method may comprise based on the indication of the second time indicating that the second time is after the first time, determining that the second time is based on the indication of the second time.

According to some aspects described herein, the biometric input received at the first time and the biometric input received at the second time comprise a two dimensional scan of a face, a three-dimensional scan of a face, a retinal scan, a fingerprint, or a handprint.

According to some aspects described herein, the computer-implemented method may comprise generating an image based on the biometric input received at the first time. Further, the computer-implemented method may comprise generating a prompt to select one or more portions of the image that correspond to the one or more portions of the biometric input received at the first time that will be different after the second time. Further, the computer-implemented method may comprise receiving an input that selects the one or more portions of the image. Further, the computer-implemented method may comprise determining that the indication of the one or more portions of the biometric input received at the first time that will be different after the second time is based on the input that selects the one or more portions of the image.

According to some aspects described herein, the image may comprise a face of a user that is a source of the biometric input, an indicator of a hair color of the user that is the source of the biometric input, an indicator of a hair length of the user that is the source of the biometric input, an indicator of an eye color of the user that is the source of the biometric input, an indicator of facial hair of the user that is the source of the biometric input, or a handprint of the user that is the source of the biometric input.

According to some aspects described herein, generating a second biometric signature may comprise determining one or more portions of the biometric input received after the second time that correspond to the one or more portions of the biometric input received at the first time that will be different after the second time. Further, generating the second biometric signature may comprise generating the second biometric signature based on the one or more portions of the biometric input received after the second time that do not include the one or more portions of the biometric input received after the second time that correspond to the one or more portions of the biometric input received at the first time that will be different after the second time.

According to some aspects described herein, generating a second authenticated signature may comprise generating the second authenticated signature based on one or more portions of the biometric input received at the first time that do not include the one or more portions of the biometric input received at the first time that will be different after the second time.

According to some aspects described herein, receiving an indication of one or more portions of the biometric input received at the first time that will be different after a second time may comprise generating a prompt to select one or more indications associated with a plurality of portions of the biometric input received at the first time.

According to some aspects described herein, the one or more indications associated with the plurality of portions of the biometric input may comprise a plurality of indicators of a portion of a face of a user that is a source of the biometric input, an indicator of a hair color of the user that is the source of the biometric input, an indicator of a hair length of the user that is the source of the biometric input, an indicator of an eye color of the user that is the source of the biometric input, an indicator of facial hair of the user that is the source of the biometric input, or a handprint of the user that is the source of the biometric input.

According to some aspects described herein, the biometric input received at the first time and the biometric input received after the second time may be received using the same type of biometric sensor.

Corresponding apparatuses, devices, systems, and computer-readable media (e.g., non-transitory computer readable media) are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
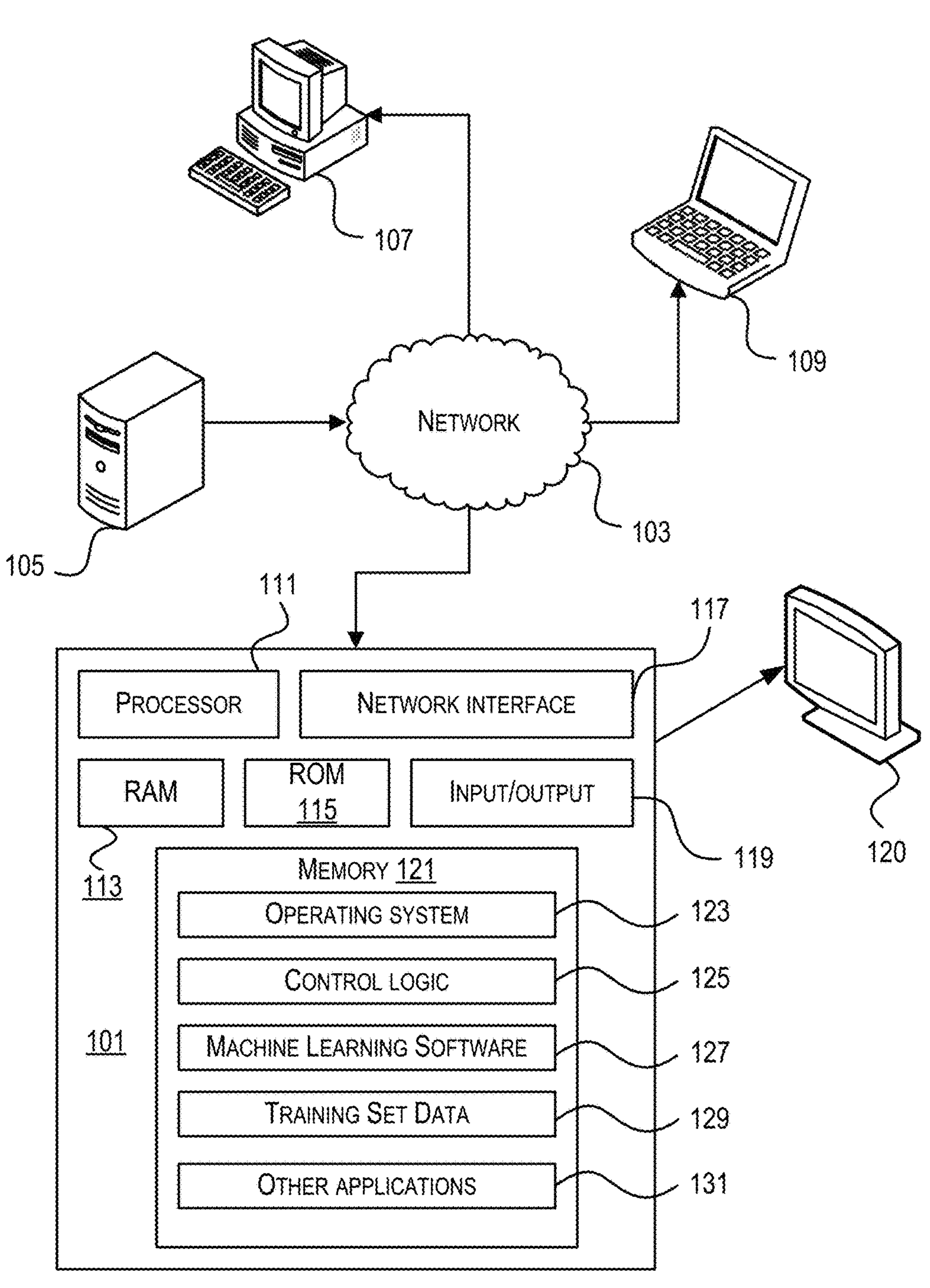
FIG. 1 illustrates an example of a computing system that may be used to implement one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Biometric authentication may be used to secure access to a variety of things including devices, physical locations, and/or access to user accounts and information. Maintaining the security and effectiveness of a biometric authentication system may include the use of regular updates to a biometric input. These updates may be based on changes in the biometric input that is authenticated and used to gain access to whatever is being secured by the biometric authentication system. For example, when the appearance of a user's face is used as a biometric input, changes to the user's face such as growing or shaving a beard or undergoing significant facial plastic surgery may render the biometric input invalid and thereby deny the user access to which the user is rightfully authorized. When a biometric input becomes invalid, potentially less secure methods such as simple passcodes may be used to generate a new biometric input.

However, the use of a less secure method as a precursor to generating a new biometric input introduces potential security weaknesses that may allow unauthorized actors to compromise the security of a system of biometric authentication. For example, when for one reason or another, a biometric input is invalid, a user may be prompted to refresh the biometric input after first confirming their identify via e-mail or text message. If the user's e-mail or text messaging devices are compromised, a malicious actor could potentially create a new biometric signature using the malicious actor's biometric input (e.g., the malicious actor's face or fingerprint). Further, since a user may be contacted using an account that may itself have been compromised any biometric signature that is subsequently created may also be compromised.

As such, authentication protocols that are vulnerable to exploitation may be subverted to gain unauthorized access to personal accounts, devices, and other areas and devices that are ostensibly being protected by biometric security. Further, the circumvention and subversion of authentication protocols may in some cases deny access to legitimate users. Accordingly, addressing the deficiencies associated with certain biometric security implementations may result in improved security.

Aspects discussed herein may relate to systems, methods, and techniques for generating more effective and secure biometric signatures. As such, the disclosed technology is directed to improving the security of biometric systems by generating a biometric signature based on anticipated differences to an existing biometric input. Further, the aspects described herein may leverage the use of event data (e.g., calendar data) to proactively prompt a user to provide indications of anticipated differences in a biometric input at a future time. Overall, the disclosed technology offers the benefits of increased security combined with the convenience of preemptively generating a biometric signal for future use.

Before discussing these concepts in greater detail, however, several examples of a computing device that may be used in implementing and/or otherwise providing various aspects of the disclosure will first be discussed with respect to FIG. 1.

FIG. 1 illustrates an example of a computing system 100 that may be used to implement one or more illustrative aspects discussed herein. For example, computing system 100 may, in some instances, implement one or more aspects of the disclosure by reading and/or executing instructions and performing one or more actions based on the instructions. In some instances, computing system 100 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing system 100 may, in some instances, operate in a standalone environment. In others, computing system 100 may operate in a networked environment. As shown in FIG. 1, various computing devices including computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Computing devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, stylus, touch screen, camera, microphone, display device, audio output device including a loudspeaker, printer, etc.), and memory 121. Processor 111 may include one or more computer processing units (CPUs), graphical processing units (GPUs), and/or other processing units such as a processor adapted to perform computations associated with machine learning. Input/output interfaces 119 may include a variety of interface units and drives for reading, writing, displaying, and/or printing data or files. Input/output interfaces 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Computing devices 105, 107, 109 may have similar or different architecture as described with respect to computing device 101. Those of skill in the art will appreciate that the functionality of computing device 101 (or computing device 105, computing device 107, computing device 109) as described herein may be spread across multiple data processing devices, for example, to distribute processing load across multiple computers, to segregate transactions based on geographic location, user access level, quality of service (QoS), etc. For example, the computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. By way of example, one or more aspects discussed herein may comprise a computing device, comprising: one or more processors; and memory storing instructions that, when executed by the one or more processors, cause the computing device to perform one or more operations discussed herein. By way of further example, one or more aspects discussed herein may comprise a non-transitory machine-readable medium storing instructions that, when executed by one or more processors, cause the one or more processors to perform one or more steps and/or one or more operations discussed herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium (e.g., a non-transitory machine-readable medium) such as a hard disk, optical disk, removable storage media, solid state memory, RAM, etc.

As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to systems, apparatuses, and methods for generating a biometric signature.

Figure 2:
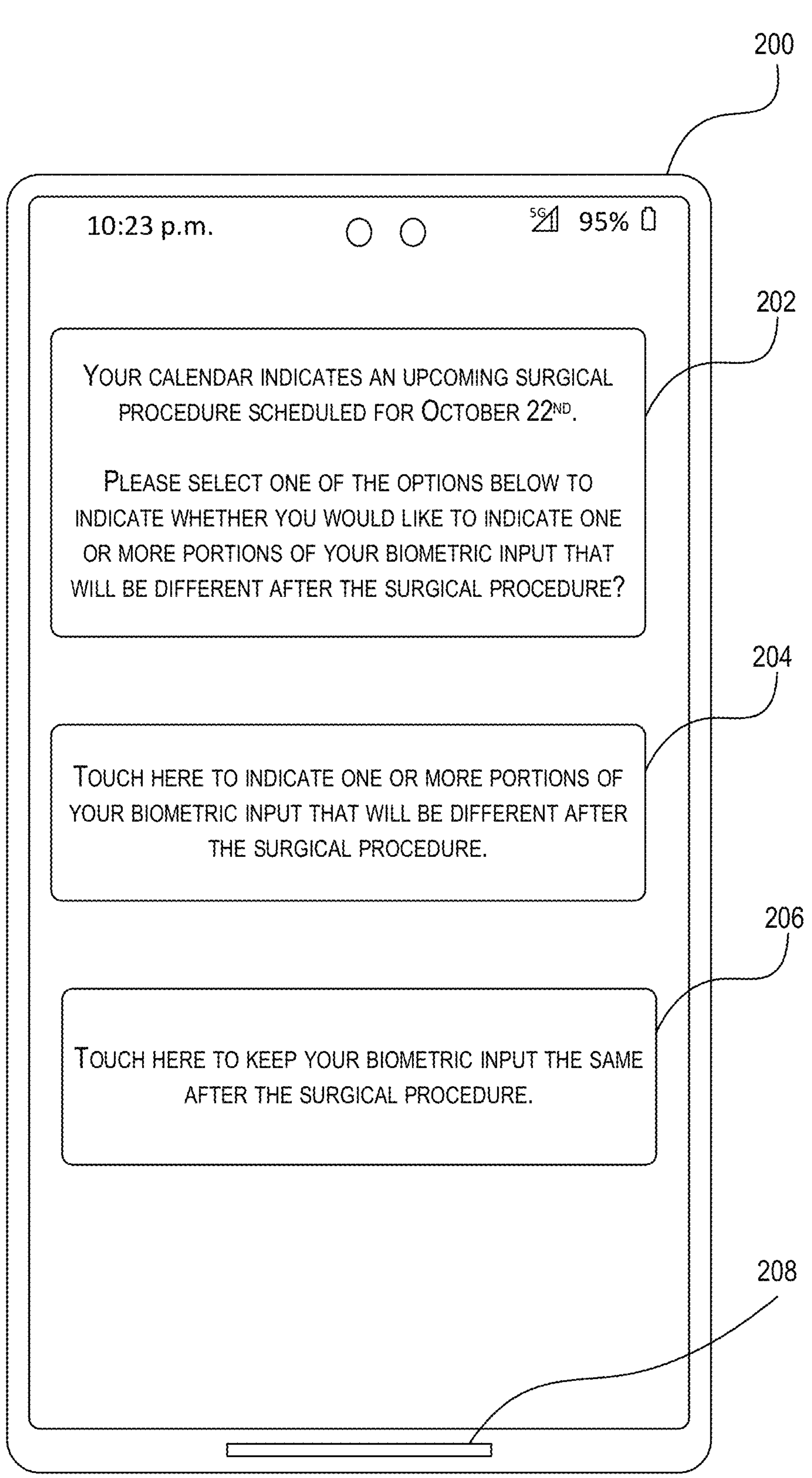
FIG. 2 illustrates an example of an interface comprising a notification based on access to event data according to one or more aspects of the disclosure.

FIG. 2 illustrates an example of an interface comprising a notification based on access to event data according to one or more aspects of the disclosure that may be implemented on the computing system 100 illustrated in FIG. 1, according to a possible embodiment of the invention.

The computing device 200 (e.g., a smartphone or tablet computing device) may be configured to provide notifications to a user. Further, the computing device may be configured to allow a user to initiate the provisioning of indications of portions of a user's biometric input that may be different at a future time. A portion of a biometric input (e.g., the biometric input of a user) may include any part of the biometric input. Further, any combination of parts of a biometric input may be used as a portion of the biometric input. For example, if a face is used as a biometric input, a portion of the biometric input may include a left eye and a mouth of the face. In some embodiments, a portion of a biometric input may comprise the entire or whole part of a biometric input. For example, the whole portion of a face that is used as a biometric input may be used as a portion of the biometric input.

In some embodiments, a portion of a biometric input may comprise one or more parts of the biometric input that comprise less than the entire or whole portion of the biometric input (e.g., if a face is used as a biometric input, a portion of the face may include the region including the nose and/or the eyes). In some embodiments, a portion of a biometric input may include one or more parts and/or exclude one or more other parts of the biometric input. For example, if a face is used as a biometric input, a portion of the biometric input may include the region including the eyes, but may exclude the region including the mouth. By way of further example, if a hand is used as a biometric input, a portion of the biometric input may comprise some fingers of the hand and may exclude the palm of the hand and/or other fingers of the hand. Additionally, if more than part of a user is used to provide a biometric input, a portion of the biometric input may comprise a portion of the parts that are used to provide the biometric input. For example, if both of a user's eyes are used as a biometric input (e.g., a retinal scan that scans both of the user's eyes), a portion of the biometric input may comprise the right eye and may not include the left eye.

In this example, the computing device 200 has, with the user's permission, accessed event data via a calendar application of a user of the computing device 200 and determined that the user is scheduled for an event (e.g., a surgical procedure) on a particular day (e.g., October 22$^{nd}$). Using one or more techniques described herein (e.g., identification of one or more key words associated with events that may result in one or more differences in the biometric input) the computing device 200 may determine that the event indicated in the event data may cause one or more differences in the biometric input (e.g., the user's face) that the user uses to access (e.g., log into) the computing device 200 and/or access various applications (e.g., banking applications) that may be implemented on the computing device 200.

In this example, the notification informs the user of the upcoming event and generates a message 202 which indicates "YOUR CALENDAR INDICATES AN UPCOMING SURGICAL PROCEDURE SCHEDULED FOR OCTOBER 22$^{ND}$." The message 202 also provides the user with the option of providing an indication of one or more portions of the user's biometric input that may be different after the time of the surgical procedure. In this example, the message 202 also indicates "PLEASE SELECT ONE OF THE OPTIONS BELOW TO INDICATE WHETHER YOU WOULD YOU LIKE TO INDICATE ONE OR MORE PORTIONS OF YOUR BIOMETRIC INPUT THAT MAY BE DIFFERENT AFTER THE SURGICAL PROCEDURE." In some embodiments, the audio output component 208 may emit a sound (e.g., a notification chime) when the message 202 is generated and/or displayed on the computing device 200. Further, the message 202 may be outputted via the audio output component 208 (e.g., a loudspeaker).

The computing device may generate the interface element 204 and the interactive element 206. The interface element 204 may provide the user with the option to select the interface element 204 by indicating "TOUCH HERE TO INDICATE ONE OR MORE PORTIONS OF YOUR BIOMETRIC THAT MAY BE DIFFERENT AFTER THE SURGICAL PROCEDURE." If a user selects the interface element 204 (e.g., by touching the interface element 204), the computing device 200 may perform operations to receive an indication of one or more portions of the user's biometric input that may be different after the time of the event (e.g., after October 22$^{nd}$). For example, the interface element 204 may be configured to initiate the execution of an application that may be used to generate a biometric signature based on the anticipated state of the user's biometric input after October 22nd.

The interactive element 206 may provide the user with the option to select the interactive element 206 by indicating "TOUCH HERE TO KEEP YOUR BIOMETRIC INPUT THE SAME AFTER THE SURGICAL PROCEDURE." If a user selects the interactive element 206 (e.g., by touching the interface element 206), the computing device 200 may stop the display of the message 202, the interface element 204, and the interactive element 206, and return to the state of the computing device 200 before the message 202, the interface element 204, and the interactive element 206 were generated.

In some embodiments, if the user of the computing device 200 chooses to indicate one or more portions of their biometric that may be different after the surgical procedure, the computing device 200 may schedule the sending of a message to the user of the computing device 200. The message may be scheduled to be sent to the user at a time prior to (e.g., the day before or the week before) the scheduled event (e.g., the surgical procedure). For example, the message may indicate "YOUR BIOMETRIC INPUT MAY BE DIFFERENT AFTER TOMORROW'S SURGICAL PROCEDURE AND THE CURRENT BIOMETRIC INPUT MAY NO LONGER BE VALID AFTERWARDS." In this way, the user may be reminded that the biometric input may not be valid after the surgical procedure.

Figure 3:
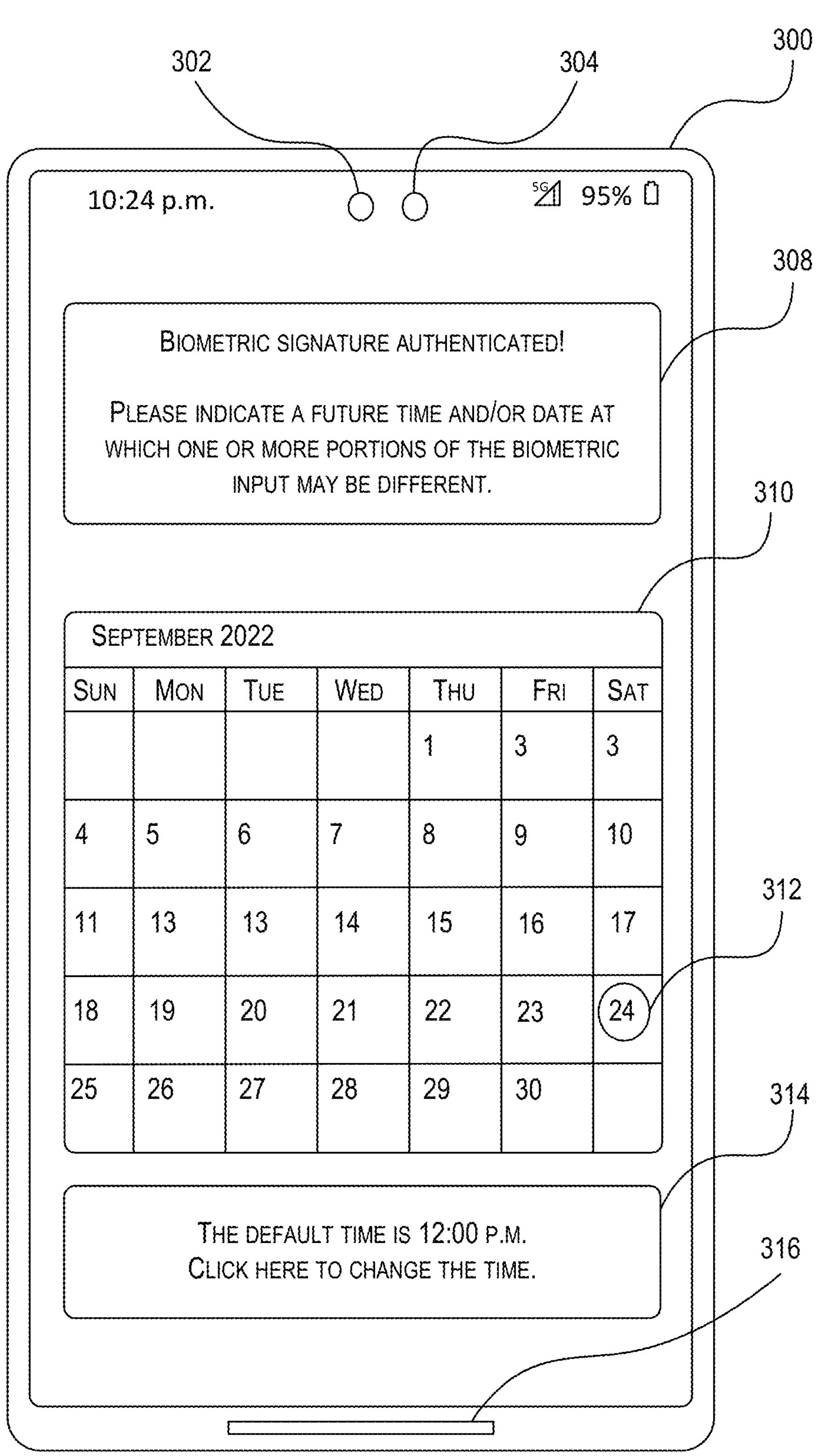
FIG. 3 illustrates an example of an interface used to receive a date and time of when anticipated differences in a biometric input are anticipated according to one or more aspects of the disclosure.

FIG. 3 illustrates an example of an interface used to receive a date and time of when anticipated differences in a biometric input are anticipated according to one or more aspects of the disclosure that may be implemented on the computing system 100 illustrated in FIG. 1, according to a possible embodiment of the invention.

The computing device 300 (e.g., a smartphone or tablet computing device) may be configured to provide notifications to a user. Further, the computing device 300 may be configured to receive a date and/or time at which a biometric input may be different. In this example, the computing device 300 has been used to authenticate a user's biometric signature based on a biometric input that was provided to the computing device 300. For example, the computing device may comprise a camera 302 that may be used to capture images and a scanner 304 that may be used to perform a three-dimensional scan of a user's face. Some combination of the camera 302 and/or the scanner 304 may be used to capture a biometric input (e.g., a user's face) and generate a biometric signature that may be authenticated by comparing the biometric signature to an authenticated signature and authenticating the biometric signature if it matches the authenticated signature.

The message 308 indicates "BIOMETRIC SIGNATURE AUTHENTICATED!" which informs the user of the computing device 300 that the biometric signature based on the user's biometric input has been authenticated. In some embodiments, generation of the message 308 may be based on some operation based on some action by the user. For example, generation of the message 308 may be based on a user's selection of an option to indicate that the user's biometric input may be different at a future time (e.g., if the user selects the interface element 204 depicted in FIG. 2). The message 308 also indicates "PLEASE INDICATE A FUTURE TIME AND/OR DATE AT WHICH ONE OR MORE PORTIONS OF THE BIOMETRIC INPUT MAY BE DIFFERENT" In some embodiments, the message 308 may be outputted via the audio output component 316 (e.g., a loudspeaker) that may audibly announce the message 308.

The computing device may generate the interactive element 310 and the interactive element 314. The interactive element 310 may include a calendar for the current month. In some embodiments, a user may cause the interactive element 310 to display a month other than the current month, which may be used to select a particular date at which one or more portions of the user's biometric input may be different. Further, the interactive element 310 may provide the user with the option to select one of the dates on the calendar, for example by touching a date on the calendar of the interactive element 310. In this example, the selection 312 on September 24$^{th}$ indicates the future date on which one or more portions of the user's biometric input may be different.

The interactive element 314 may provide a user with the option of indicating a time of day at which one or more portions of the user's biometric input may be different. In this example, the interactive element 314 indicates "THE DEFAULT TIME IS 12:00 P.M. CLICK HERE TO CHANGE THE TIME." If the user touches the interactive element 314, the user may select a time at which one or more portions of the user's biometric input may be different. If the user does not interact with the interactive element 314, a default time of 12:00 p.m. may be used as the time of day at which one or more portions of the user's biometric input may be different.

Figure 4:
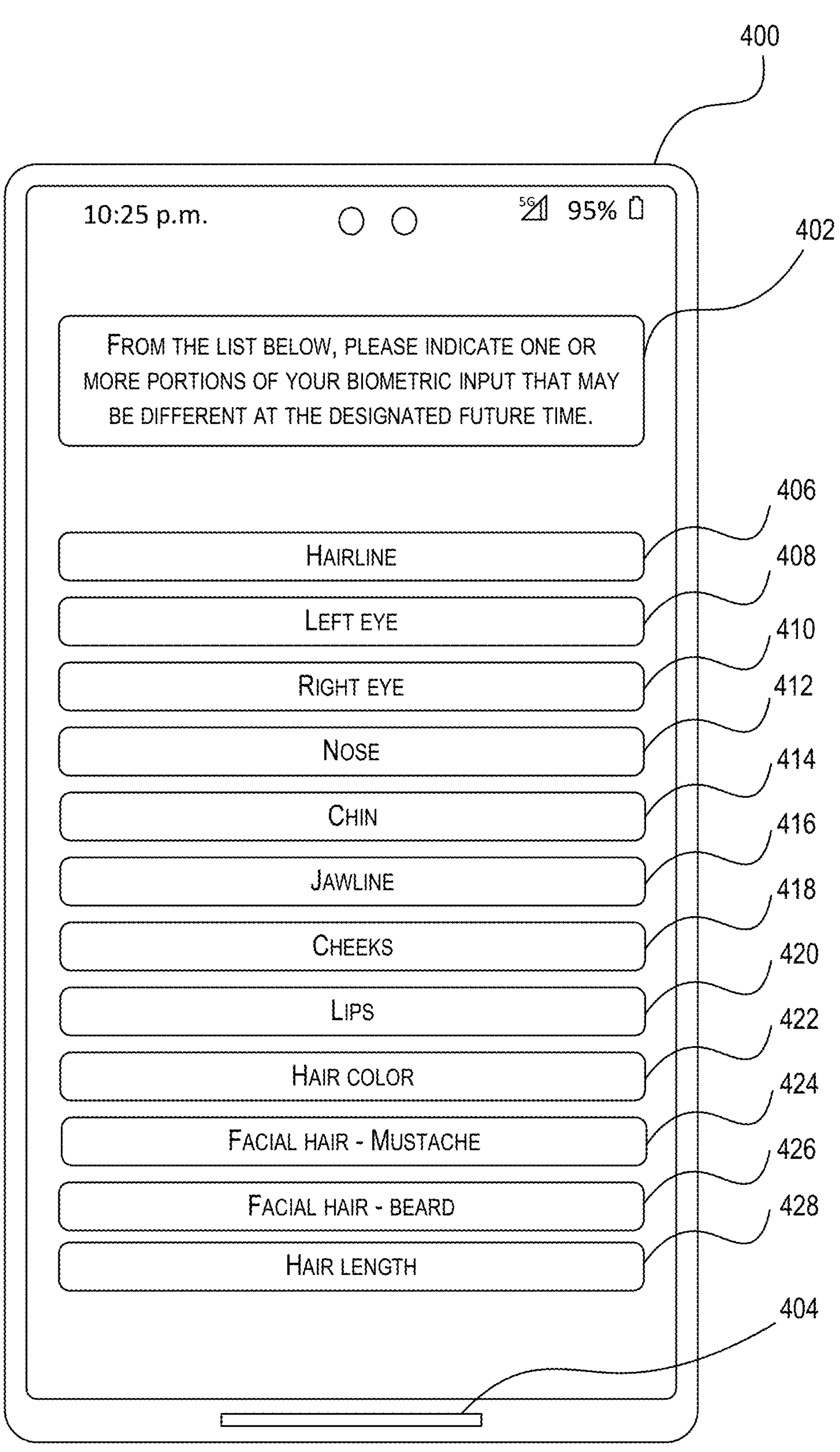
FIG. 4 illustrates an example of an interface comprising a list that is used to receive indications of portions of a biometric input that may be different at a designated time according to one or more aspects of the disclosure.

FIG. 4 illustrates an example of an interface comprising a list that is used to receive indications of portions of a biometric input that may be different at a designated time according to one or more aspects of the disclosure that may be implemented on the computing system 100 illustrated in FIG. 1, according to a possible embodiment of the invention.

The computing device 400 (e.g., a smartphone or tablet computing device) may be configured to receive one or more indications from a list that corresponds to one or more portions of a biometric input that may be different at a future time. Further, the computing device 400 may generate a message prompting a user to indicate one or more portions of a biometric that may be different at a future time. In this example, the computing device 400 has generated a message 402 which indicates "FROM THE LIST BELOW, PLEASE INDICATE ONE OR MORE PORTIONS OF YOUR BIOMETRIC INPUT THAT MAY BE DIFFERENT AT THE DESIGNATED FUTURE TIME."

The computing device 400 may also generate the interactive elements 406-428 which indicate portions of a biometric input (e.g., a face) that may be different at a future time. One or more of the interactive elements 406-428 may be selected (e.g., by touching an interactive element). For example, if a user's hairline and/or either eye are expected to be different at a future time (e.g., the biometric inputs may be different as the result of a beauty treatment in which false eyelashes, colored contact lenses, reshaped and/or plucked eyebrows, extensive makeup, and/or a radically new hairstyle are applied), the interactive element 406 which indicates a hairline, the interactive element 408 which indicates a left eye, and/or interactive element 412 which indicates a right eye may be selected. If a user's nose, chin, and/or jawline are expected to be different at a future time (e.g., the biometric inputs may be different as the result of a surgical procedure on a user's face), the interactive element 412 which indicates a nose, the interactive element 414 which indicates a chin, and/or the interactive element 416 which indicates a jawline may be selected. If a user's cheeks and/or lips are expected to be different at a future time, the interactive element 418 which indicates cheeks, and/or the interactive element 420 which indicates lips may be selected. If a user's hair color (e.g., changed as a result of using hair dye), facial hair (e.g., growing or trimming a beard and/or mustache), and/or hair length are expected to be different at a future time, the interactive element 422 which indicates hair color, the interactive element 424 which indicates facial hair including a mustache, the interactive element 426 which indicates facial hair including a beard, and/or the interactive element 428 which indicates hair length may be selected.

Based on which of the interactive elements 406-428 are selected (e.g., selected by touching an interactive element), the computing device 400 may determine that the portion of the biometric input associated with the interactive element shall not be used when generating a biometric signature based on a biometric input. For example, if a user selected the interactive element 426 to indicate that the user's long beard will be shaved off by the designated future time, the computing device 400 may generate an authenticated biometric signature that does not use the portions of the user's face covered by their beard. The authenticated biometric signature generated by the computing device 400 may subsequently be used to authenticate the user's biometric input after the designated future time.

Figure 5:
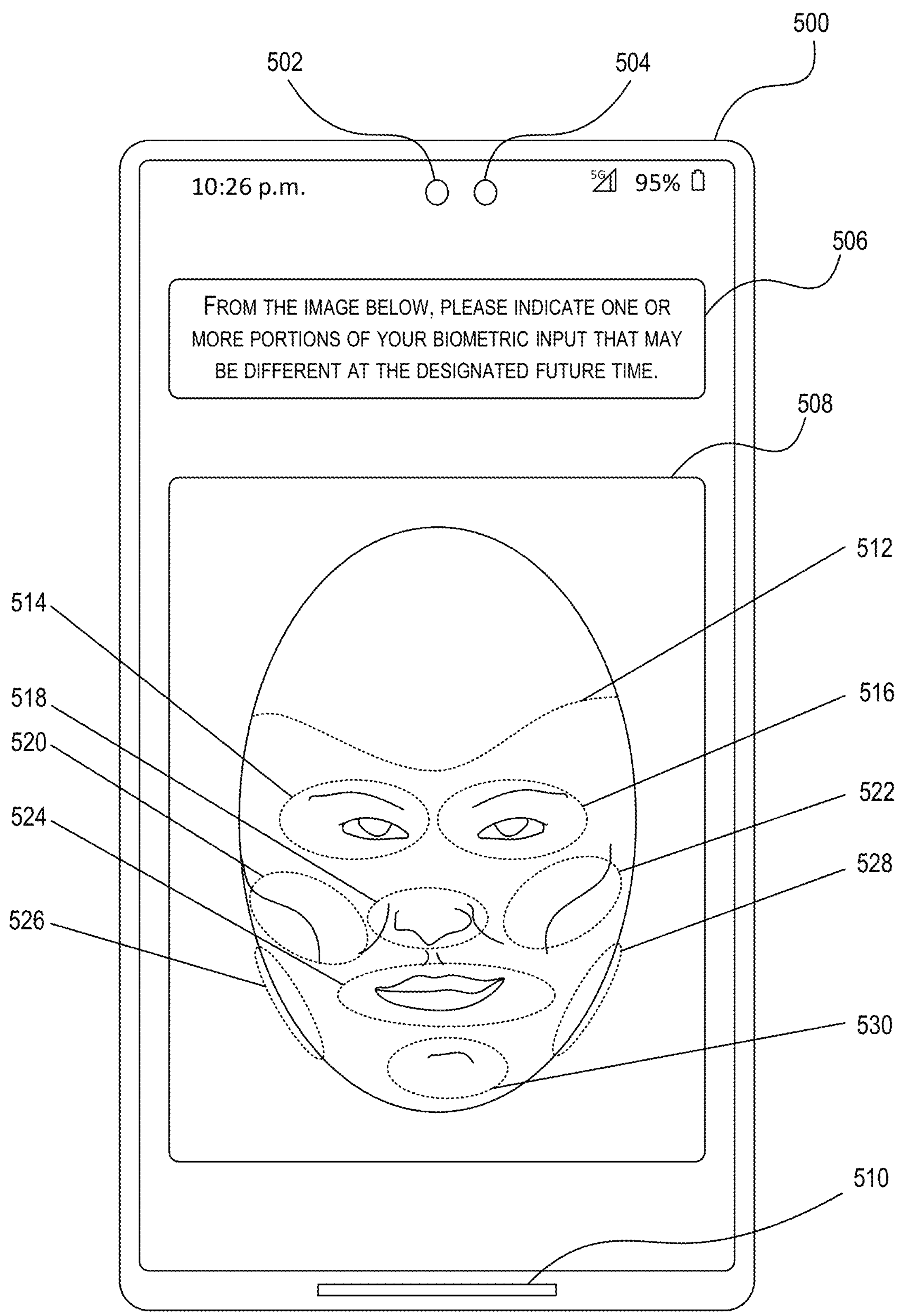
FIG. 5 illustrates an example of an interface comprising an image that is used to receive indications of portions of a biometric input that may be different at a designated time according to one or more aspects of the disclosure.

FIG. 5 illustrates an example of an interface comprising an image that is used to receive indications of portions of a biometric input that may be different at a designated time according to one or more aspects of the disclosure that may be implemented on the computing system 100 illustrated in FIG. 1, according to possible embodiments of the invention.

The computing device 500 (e.g., a smartphone or tablet computing device) may be configured to receive indications of one or more portions of an image 508 that correspond to a biometric input that may be different at a future time. In this example, the computing device 500 may generate a message 506, which prompts a user to indicate one or more portions of an image 508 that correspond to one or more portions of a biometric input that may be different at a future time. The message 506 indicates "FROM THE IMAGE BELOW, PLEASE INDICATE ONE OR MORE PORTIONS OF YOUR BIOMETRIC INPUT THAT MAY BE DIFFERENT AT THE DESIGNATED TIME." The image 508 referred to in the message 506 may be based on a biometric input (e.g., a face) that was provided to the computing device 500. For example, the computing device may comprise a camera 502 that may be used to capture images and a scanner 504 that may be used to perform a three-dimensional scan of a user's face. Some combination of the camera 502 and/or the scanner 504 may be used to generate the image 508 that is displayed on a display of the computing device 500.

The image 508 comprises interactive elements 512-530, any of which may be selected to indicate that the portion of the image corresponding to a portion of a biometric input may be different at the designated future time. The interactive elements 512-530 may be generated based on one or more image recognition techniques that may be used to detect different facial features (e.g., eyes, chin, hairline, and/or lips) of the image 508. Further, one or more of the interactive elements 512-530 may be selected (e.g., by touching an interactive element). For example, if a user's hairline and/or either eye are expected to be different at a future time, the interactive element 512 which indicates a hairline, the interactive element 514 which indicates a left eye, and/or interactive element 516 which indicates a right eye may be selected. If a user's nose, right cheek, and/or left cheek are expected to be different at a future time, the interactive element 518 which indicates a nose, the interactive element 520 which indicates a left cheek, and/or the interactive element 522 which indicates a right cheek may be selected. If a user's lips or jawline are expected to be different at a future time, the interactive element 524 which indicates lips, and/or the interactive elements 526 and 528 which indicate the left jawline and right jawline respectively may be selected. If a user's chin is expected to be different at a future time, the interactive element 530 which indicates the user's chin may be selected.

Based on the interactive elements 512-530 that are selected (e.g., selected by touching an interactive element), the computing device 500 may determine that the portion of the biometric input associated with the interactive element may not be used when generating a biometric signature based on a biometric input. For example, if a user selected the interactive element 518 to indicate that the portion of the user's face including the user's nose would be different at the designated future time, the computing device 500 may generate an authenticated biometric signature that does not use the portions of the user's face including the user's nose. The authenticated biometric signature generated by the computing device 500 may then be used to authenticate the user's biometric input after the designated future time.

Figure 6:
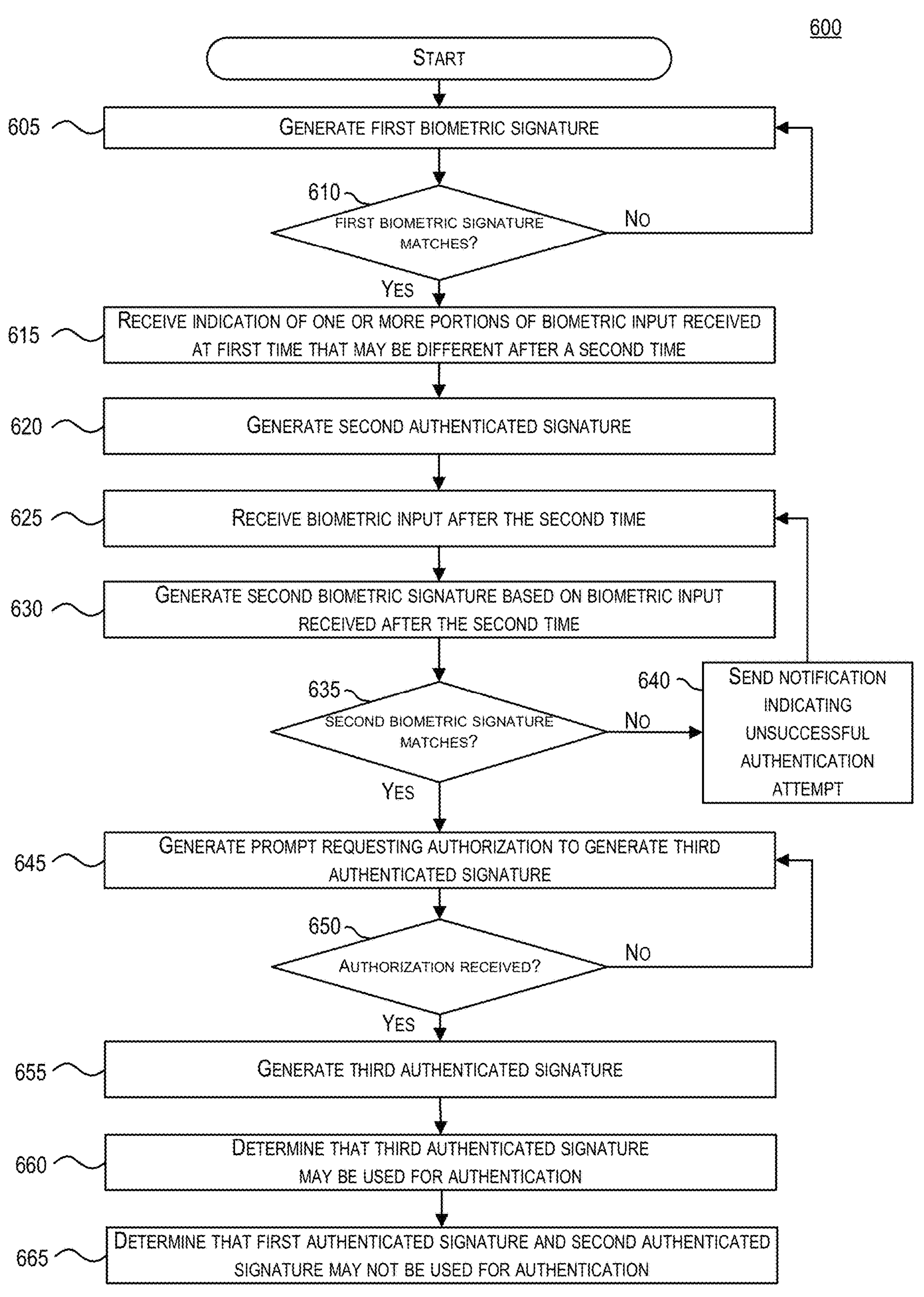
FIG. 6 illustrates an example flow chart for a method of generating a biometric signature according to one or more aspects of the disclosure.

FIG. 6 illustrates an example flow chart for a method of generating a biometric signature according to one or more aspects of the disclosure. Method 600 may be implemented by a suitable computing system, as described further herein. For example, method 600 may be implemented by any suitable computing environment by a computing device and/or combination of computing devices, such as computing devices 101, 105, 107, and 109 of FIG. 1. Method 600 may be implemented in suitable program instructions, such as in machine learning software 127, and may operate on a suitable training set, such as training set data 129.

At step 605, the system may generate a first biometric signature based on a biometric input received at a first time. The first time may comprise a date and/or a time of day. Further, the biometric input (e.g., a biometric input received at a first time that is prior to a second time) may comprise a two dimensional scan of a face (e.g., a two dimensional image of a face captured by an image sensor), a three-dimensional scan of a face (e.g., a three-dimensional facial scan generated by using LiDAR, or a dot projector and infrared camera), a retinal scan, a fingerprint, and/or a handprint. For example, a user's face may be used as a biometric input to a camera that captures an image (e.g., a two-dimensional or three-dimensional image) of the user's face. The system may then analyze the image of the user's face and generate a first biometric signature based on the features of the image. The first biometric signature may comprise an alphanumeric value that may, in the course of authenticating the first biometric signature, be compared to a first authenticated signature that is based on a previously provided biometric input.

By way of further example, generating the first biometric signature may comprise using a sensor (e.g., a camera, a thermal sensor, and/or an ultrasonic scanner) to detect the biometric input received at the first time. Based on the output from the sensor, the system may use a machine learning model, image recognition, or one or more other techniques to extract features of the biometric input (e.g., the geometry of a user's face, a heat map of the user's face, or a color map of the user's face). The features of the biometric input may then be used to generate the first biometric signature.

In some embodiments, the first biometric signature may be based on one or more portions of the biometric input received at the first time, any combination of which may be used as the first biometric signature. For example, a user may provide a finger to a fingerprint scanner that captures multiple images of the user's finger and thereby captures images of the user's fingerprint. The combination of multiple images of the user's finger, which may capture different sides and/or angles of the user's finger, may be used as the first biometric input.

At step 610, based on determining that the first biometric signature matches a first authenticated signature, step 615 may be performed. For example, the system may access a first authenticated signature that was previously generated. The first biometric signature may be compared to the first authenticated signature, and if the first biometric signature matches the first authenticated signature (e.g., the value associated with the first biometric signature is an exact match for the value of the first authenticated signature or the value associated with the first biometric signature has a similarity to the first authenticated signature that is within a predetermined acceptable margin of error), step 615 may be performed.

Based on determining that the first biometric signature does not match a first authenticated signature in step 610, step 605 may be performed (e.g., a user may again provide the first biometric input) or the method may end. For example, the system may access a first authenticated signature that was previously generated. The first biometric signature may be compared to the first authenticated signature, and if the first biometric signature does not match the first authenticated signature, step 605 may be performed. In some embodiments, the system may send a notification to a user (e.g., an authenticated user associated with the first authenticated signature). The notification may indicate that the first biometric input was provided and not authenticated.

At step 615, the system may receive an indication of one or more portions of the biometric input received at the first time that may be different after a second time. For example, the system may provide a user (e.g., the user providing the biometric input) with a list of portions of a biometric input (e.g., portions of a face including the nose, eyes, chin, and/or hairline) that may be different after a second time (e.g., a time subsequent to the first time). The user may then provide an indication of the biometric input received at the first time that may be different after a second time by selecting one or more of the portions from the list. Further, the indication may comprise an indication of the second time. For example, if on the fifth of January the user is scheduled for a rhinoplasty one month in the future on the fifth of February, the user may indicate that the shape of the user's nose may be different on the fifth of February.

The one or more indications associated with the plurality of portions of the biometric input may comprise a plurality of indicators (e.g., an image of the user's face with indications of the portions of the image that represent the nose, eyes, chin, and/or hairline) of one or more portions of a face of a user that is a source of the biometric input. Further, the one or more indications may comprise an indicator of a hair color of the user that is the source of the biometric input (e.g., a list of hair colors including black, brown, red, and blonde), an indicator of a hair length of the user that is the source of the biometric input (e.g., images of different types of hair length and/or hair style), an indicator of an eye color of the user that is the source of the biometric input (e.g., a list of eye colors including brown eyes, grey eyes, blue eyes, and/or green eyes), an indicator of facial hair of the user that is the source of the biometric input (e.g., images of different lengths and styles of facial hair including different moustache and beard styles), and/or a handprint (e.g., a full or partial handprint which may include one or more fingerprints) of the user that is the source of the biometric input.

The indication of the one or more portions of the biometric input received at the first time that may be different after a second time may be based on a prompt to select one or more indications associated with a plurality of portions of the biometric input received at the first time. An example of a prompt to select one or more indications associated with a plurality of portions of the biometric input received at the first time is depicted in the message 506 of FIG. 5 which is described herein. Further, the second time may be determined based on receiving an indication of the second time. For example, as shown in FIG. 3, the system may generate a user interface that includes a calendar that a user may use to indicate the second time.

Based on the indication of the second time indicating that the second time is after the first time, the system may determine that the second time is based on the indication of the second time. Further, the system may be configured to determine whether the second time is after the first time. For example, if a user provided an indication of a second time that was one week before the first time, the system may generate a notification indicating that the second time may not be used and that the user should indicate a second time that is after the first time.

The indication of the one or more portions of the biometric input received at the first time that may be different after the second time may comprise one or more changes to a geometry of a face of a user that is a source of the biometric input. For example, the indication of the one or more portions of the biometric input received at the first time that may be different after the second time may comprise an anticipated difference in the shape of a user's chin, the shape of a user's eyes, the shape of a user's hairline, and/or the shape or length of a user's nose. Further, the one or more changes to the geometry of the face may comprise a nasal shape change, an eye shape change, a chin shape change, a cheek shape change, a hairline shape change, and/or a lip shape change. Further, the geometry of the face of the user may comprise any spatial relationships between two or more points on the face of the user.

At step 620, the system may generate a second authenticated signature based on the biometric input received at the first time and the indication of the one or more portions of the biometric input received at the first time that may be different after the second time. Generating the second authenticated signature may comprise generating the second authenticated signature based on one or more portions of the biometric input received at the first time that do not include the one or more portions of the biometric input received at the first time that were indicated as being expected to be different after the second time. For example, if the biometric input is a face and a user indicates that their nose will be different after the second time, the system may generate a second authenticated signature based on the portions of the user's face excluding the nose.

The biometric input received at the first time and the biometric input received after the second time may be received using the same type of biometric sensor. For example, if a three dimensional face scanner is used to capture the biometric input received at the first time a three dimensional face scanner that is either the same or configured to scan faces and generate the same sensor output as the three dimensional face scanner used to capture the biometric input received at the first time.

At step 625, the system may receive a biometric input after the second time. For example, if a biometric signature was received for the first time on the fifth of January and the second time was indicated as being the fifth of February, the second time may comprise any day after the fifth of February. Further, if the first time may comprise a time of day (e.g., 1:00 p.m.) and a date (e.g., the fifth of February), the second time may comprise any time after the time of day on the date of the first time. For example, if the second time is the fifth of February at 1:00 p.m., the second time may be any time after the fifth of February at 1:00 p.m. (e.g., 1:01 p.m. on February fifth or 1:00 p.m. on the tenth of February).

At step 630, the system may generate a second biometric signature based on the biometric input received after the second time and the indication of the one or more portions of the biometric input received at the first time that may be different after the second time. In some embodiments, the scan may include the user's entire face and the system may then mask the portions of the user's face (e.g., the lips) that were indicated as being different after the second time.

Further, generating a second biometric signature may comprise generating the second biometric signature based on the one or more portions of the biometric input received after the second time that do not include the one or more portions of the biometric input received after the second time that correspond to the one or more portions of the biometric input received at the first time that may be different after the second time. For example, if the biometric input is a facial scan and the indication of the one or more portions of the biometric input received at the first time that may be different after the second time comprised an indication that the mouth of the user would be different after the second time (e.g., following surgery to correct a cleft palate or hare lip) the scan could exclude the region of the user's face around the user's mouth.

Generating a second biometric signature may comprise determining one or more portions of the biometric input received after the second time that correspond to the one or more portions of the biometric input received at the first time that may be different after the second time. For example, the biometric input may comprise a face. Further, the first biometric signature and/or the second biometric signature may be based on the geometry of the face, and the portions of the biometric input received at the first time that may be different after the second time comprise the mouth region of the biometric input. The system may use one or more face detection techniques to determine the portion of the face that includes the mouth region.

At step 635, based on determining that the second biometric signature matches a second authenticated signature, step 645 may be performed. For example, the system may access the second authenticated signature that was previously generated (e.g., the second authenticated signature generated at step 620). The second biometric signature may be compared to the second authenticated signature, and if the second biometric signature matches the second authenticated signature (e.g., the value associated with the second biometric signature is the same as the value of the second authenticated signature), step 645 may be performed.

Based on determining that the second biometric signature does not match the second authenticated signature, step 640 may be performed (e.g., a notification indicating an unsuccessful authentication attempt may be sent to the user that is the source of the biometric input received at the first time) or the method may end. For example, the system may access a second authenticated signature that was previously generated. The second biometric signature may be compared to the second authenticated signature, and if the second biometric signature does not match the second authenticated signature, step 640 may be performed.

At step 640, the system may, based on the second biometric signature not matching the second authenticated signature, send a notification indicating an unsuccessful authentication attempt to a user that is a source of the biometric input received at the first time. An unsuccessful authentication attempt (e.g., providing a biometric signature that does not match an authenticated signature) may cause the system to send a notification (e.g., a text message and/or e-mail) to the source of the biometric input. For example, the notification sent to the source of the biometric input received at the first time may include an indication that "AN UNSUCCESSFUL ATTEMPT TO ACCESS YOUR ACCOUNT OCCURRED AT 9:59 A.M." After sending the notification indicating an unsuccessful authentication attempt, step 625 may be performed (e.g., a user may again provide a second biometric input) or the method 600 may end.

At step 645, the system may, based on the second biometric signature matching the second authenticated signature, generate a prompt requesting authorization to generate a third authenticated signature based on the biometric input received after the second time. For example, the system may generate a prompt on a graphical user interface (e.g., a message prompting a user to authorize the generation of the third authenticated signature) and/or via an audio output device. The prompt may request that a user touch some portion of the user interface to indicate authorization of the third authenticated signature (e.g., the user may touch an interface element of a touch screen that indicates authorization to generate the third authenticated signature) and/or utter the user's authorization to generate the third authenticated signature (e.g., the user may say "YES" in response to an audio prompt requesting whether the user authorizes the generation of a third authenticated signature).

At step 650, based on determining that authorization was received to generate the third authenticated signature, step 655 may be performed. For example, the system may be configured to detect an input to a user interface that includes the indication of the prompt requesting authorization to generate a third authenticated signature. Based on the system determining that a user has touched a portion of a user interface indicating authorization to generate the third authenticated signature, the third authenticated signature may be generated (e.g., step 655 may be performed).

Based on the system determining that authorization to generate the third authenticated signature was not received, step 645 may be performed (e.g., the prompt requesting authorization to generate the third authenticated signature may be generated) or the method may end. For example, if the user does not provide authorization to generate the third authenticated signature within a predetermined period of time (e.g., ten seconds) then step 645 may be performed.

At step 655, the system may, based on receiving the authorization to generate the third authenticated signature, generate the third authenticated signature based on the biometric input received after the second time. For example, generating the third authenticated signature may comprise using a sensor (e.g., a camera, a thermal sensor, and/or an ultrasonic scanner) to detect the biometric input received after the second time. Based on the output from the sensor, the system may use a machine learning model, image recognition, or other technique to extract features of the biometric input received after the second time (e.g., the geometry of a user's face, a heat map of the user's face, or a color map of the user's face). The features may then be used to generate the third authenticated signature.

At step 660, the system may determine that the third authenticated signature may be used for authentication. For example, the system may use the third authentication signature to authenticate a biometric input (and the resulting signature based on the biometric input) that is used after the third authentication signature is generated and/or determined to be used for authentication. In some embodiments, the third authentication signature may be used instead of the first authentication signature and/or the second authentication signature. Further, the system may delete and/or remove the first authentication signature and/or the second authentication signature after the third authenticated signature is generated and/or determined to be used for authentication. In some embodiments, the system may add the third authenticated signature to a list of valid signatures in order to indicate that the third authenticated signature is valid and may be used for authentication.

At step 665, the system may determine that the first authenticated signature and/or the second authenticated signature may not be used for authentication. For example, the system may add the first authenticated signature and/or the second authenticated signature to a list of invalid signatures to indicate that the first authenticated signature and/or the second authenticated signature are invalid and may not be used for authentication. In some embodiments, the system may remove (e.g., delete) the first authenticated signature and/or the second authenticated signature from any locations (e.g., a memory or other storage device) in which the first authenticated signature and/or the second authenticated signature are stored and/or available for use to authenticate a biometric input.

Figure 7:
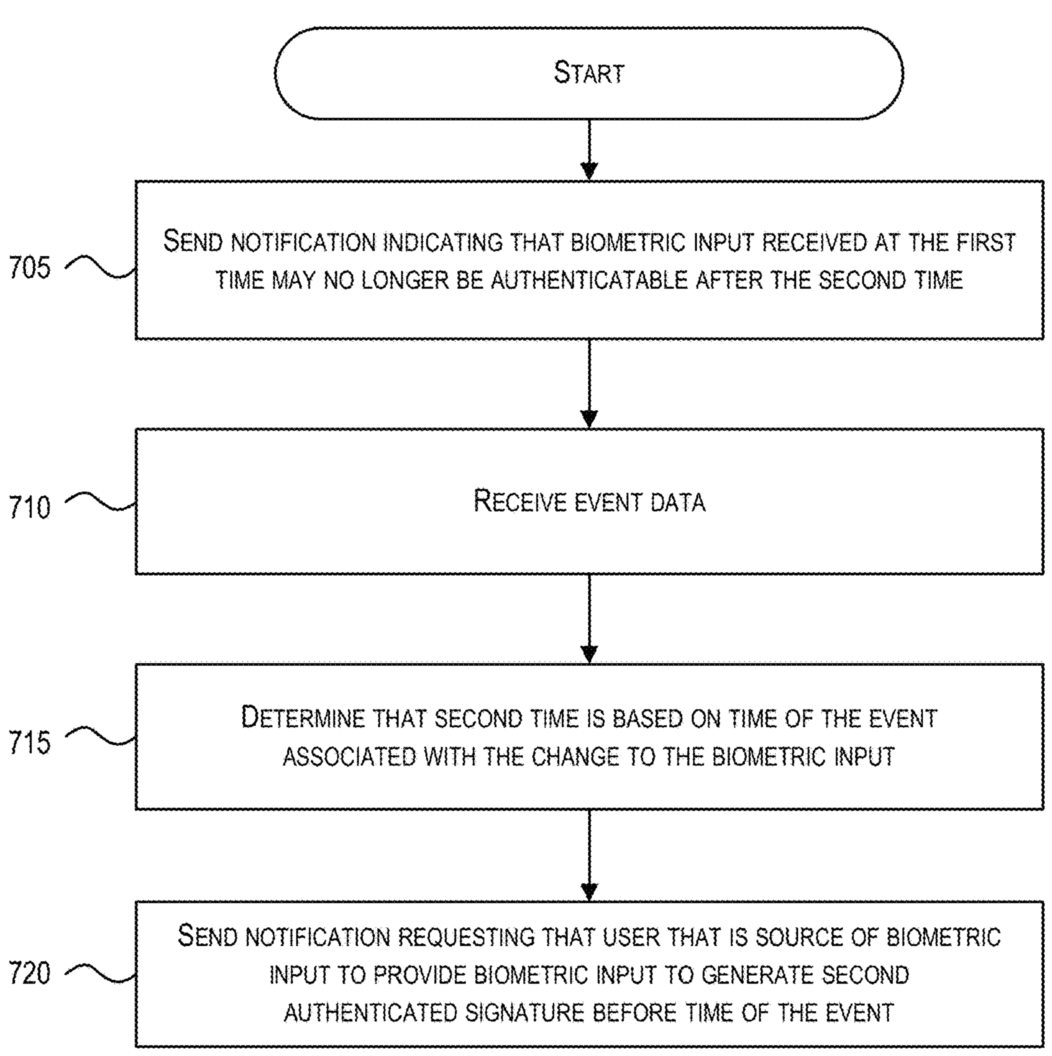
FIG. 7 illustrates an example flow chart for a method of sending notifications associated with the generation of a biometric signature according to one or more aspects of the disclosure.

FIG. 7 illustrates an example flow chart for a method of sending notifications associated with the generation of a biometric signature according to one or more aspects of the disclosure. Method 700 may be implemented by a suitable computing system, as described further herein. For example, method 700 may be implemented in any suitable computing environment by a computing device and/or combination of computing devices, such as computing devices 101, 105, 107, and 109 of FIG. 1. Method 700 may be implemented in suitable program instructions, such as in machine learning software 127, and may operate on a suitable training set, such as training set data 129. Furthermore, one or more steps and/or one or more portions of method 700 may be incorporated into method 600.

At step 705, the system may send a notification to a user that is a source of the biometric input received at the first time. The notification may be sent after the first time and before the second time. Further, the notification may indicate that the biometric input received at the first time may no longer be authenticatable after the second time. The system may determine the source of the biometric input received at the first time based on accessing identifying data associated with the biometric input received at the first time. The identifying data may comprise one or more ways (e.g., e-mail, text message, and/or automated telephone call) in which a notification may be sent to the source of the biometric input received at the first time. For example, the system may determine that the source of the biometric input received at the first time is a particular person who has expressed a preference for receiving notifications by text message. If the second time is the ninth of May at 1:00 p.m., the system may send the text message to the person on the ninth of May after 1:00 p.m. (e.g., at 1:01 p.m. on the ninth of May).

At step 710, the system may receive event data comprising a time of an event associated with a change to the biometric input that may result in the one or more portions of the biometric input received at the first time being different after the second time. For example, the system may periodically request event data and/or receive event data without requesting the event data, from an application that maintains information associated with events scheduled for the source of the biometric input received at the first time.

The event data may be received from a calendar application of a user that is a source of the biometric input. For example, the system may (with user authorization) access a calendar application of the user. The calendar application may comprise event data that indicates the time (e.g., the ninth of May) of a procedure (e.g., a facial surgery) that may cause one or more portions of the biometric input (e.g., the user's face) received at the first time to be different after the second time (e.g., the time of the procedure). The system may then receive the event data indicating the type (e.g., a surgical procedure that may cause the biometric input received at the first time to be different after the second time) and time (e.g., the ninth of May) of the procedure.

In some embodiments, the system may, with the user's permission, access an application (e.g., an e-mail application and/or a text messaging application) and/or one or more messages associated with an application (e.g., one or more e-mail messages and/or one or more text messages). The system may then detect one or more portions of the one or more messages that may indicate a time of an event associated with a change to the biometric input (e.g., a change to the biometric input that may indicate a time of an event that may result in the one or more portions of the biometric input received at the first time being different after the second time). For example, the system may, with the user's permission, periodically scan the user's e-mail messages and/or text messages in search of indications of events that may be associated with a biometric input being different at a future time.

At step 715, the system may determine that the second time is based on the time of the event associated with the change to the biometric input. For example, after receiving the event data, the system may analyze the event data for one or more events that may be associated with the biometric input received at the first time being different after the second time. For example, the system may determine whether the event data comprises one or more key words (e.g., surgery, rhinoplasty, and/or face lift) associated with an event (e.g., a surgical procedure) that would result in the biometric input received at the first time being different after the second time. The system may then determine that the second time (e.g., the time after the event) may be after the event (e.g. the surgical procedure).

By way of further example, if the system accessed a message (e.g., an e-mail message and/or text message), the system may analyze the message for one or more events that may be associated with the biometric input received at the first time being different after the second time. For example, the system may determine whether the message comprises one or more key words (e.g., hair cut or salon facial treatment in which eye brows, lips, and other facial features may be cosmetically altered through use of makeup and other procedures) associated with an event (e.g., a barber appointment or salon appointment) that may result in the biometric input received at the first time being different after the second time. The system may then determine that the second time (e.g., the time after the salon facial treatment) may be after the event (e.g. the salon appointment).

At step 720, the system may send a notification requesting a user that is a source of the biometric input to provide a biometric input to generate the second authenticated signature before the time of the event associated with the change to the biometric input. Further, the system may be configured to send a notification to a user that is a source of the biometric input a predetermined amount of time before the time of the event associated with the change to the biometric input. For example, the system may send a notification (e.g., a text message) to the user that is the source of the biometric input, one day or one week before the date of a scheduled a surgical procedure that may change the appearance of the user's face, which the user uses as a biometric input. The notification sent to the user may include a reminder of the upcoming event (e.g., a reminder including the time and nature of the upcoming event) as well as instructions for the user to provide a biometric input to generate the second authenticated signature before the time of the event associated with the change to the biometric input. For example, the notification may include a message indicating that the user may "PLEASE PROVIDE A FACIAL SCAN AND INDICATE THE PORTIONS OF YOUR FACE THAT MAY BE DIFFERENT AFTER THE UPCOMING SURGERY."

Figure 8:
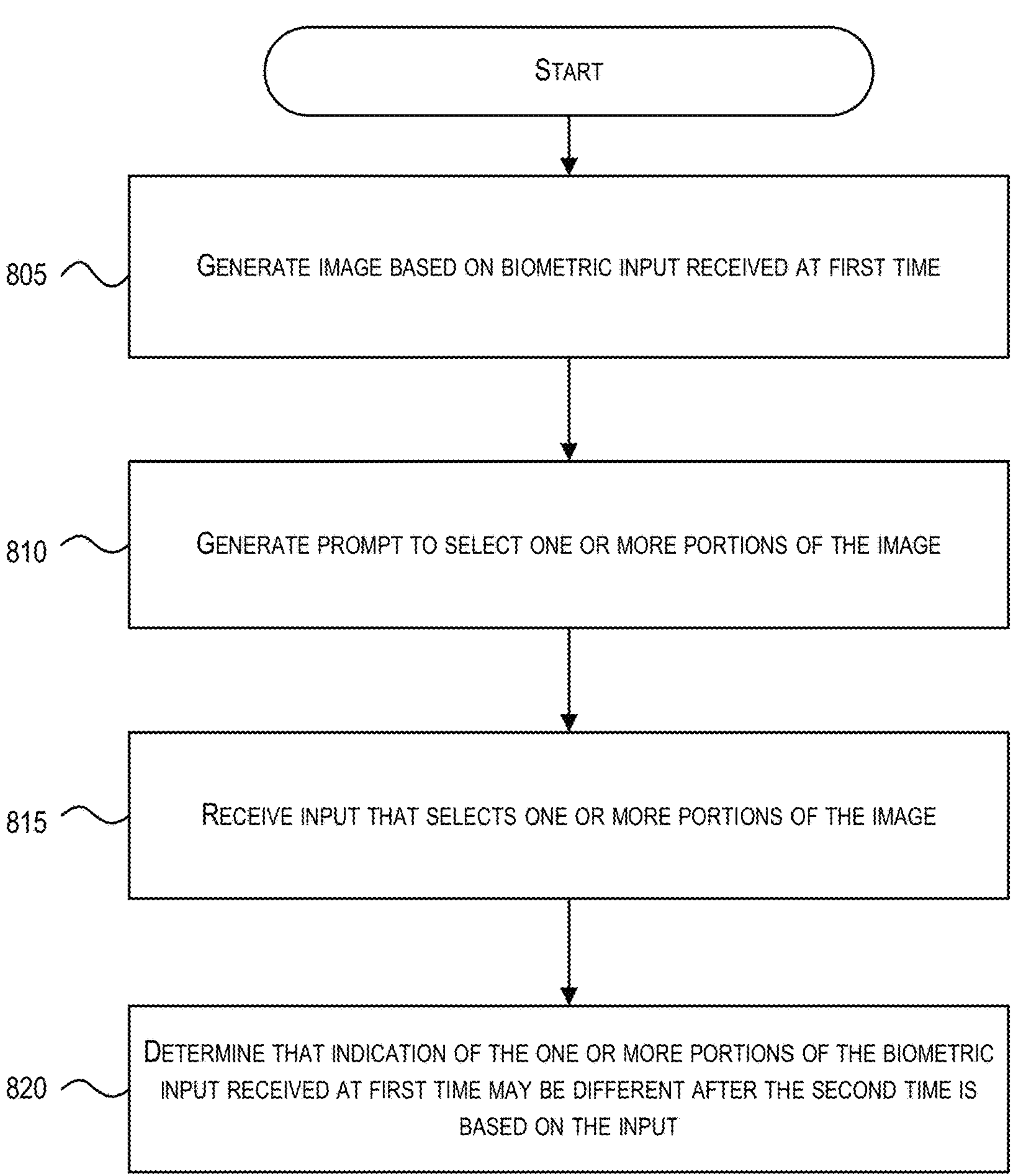
FIG. 8 illustrates an example flow chart for a method of receiving an input associated with generating a biometric signature according to one or more aspects of the disclosure.

FIG. 8 illustrates an example flow chart for a method of receiving an input associated with generating a biometric signature according to one or more aspects of the disclosure. Method 800 may be implemented by a suitable computing system, as described further herein. For example, method 800 may be implemented by any suitable computing environment by a computing device and/or combination of computing devices, such as computing devices 101, 105, 107, and 109 of FIG. 1. Method 800 may be implemented in suitable program instructions, such as in machine learning software 127, and may operate on a suitable training set, such as training set data 129. Furthermore, one or more steps and/or one or more portions of method 800 may be incorporated into method 600.

At step 805, the system may generate an image based on the biometric input received at the first time. For example, the system may use a camera to capture an image of a user's face that is used as the biometric input received at the first time. The image may comprise a face of a user that is a source of the biometric input (e.g., a color image of a user's face captured from a smartphone camera), an indicator of a hair color of the user that is the source of the biometric input (e.g., a drop down indicator that may be used to select a hair color associated with the biometric input), an indicator of a hair length of the user that is the source of the biometric input (e.g., a drop down indicator that may be used to select a short, medium, or long hair length associated with the biometric input), an indicator of an eye color of the user that is the source of the biometric input (e.g., a drop down indicator that may be used to select an eye color associated with the biometric input), an indicator of facial hair of the user that is the source of the biometric input (e.g., a drop down indicator that may be used to select a moustache or beard associated with the biometric input), or a handprint of the user that is the source of the biometric input.

At step 810, the system may generate a prompt to select one or more portions of the image that correspond to the one or more portions of the biometric input received at the first time that may be different after the second time. For example, an image of the source of the biometric input (e.g., an image of a user's face) may be displayed on a display. The display may be configured to receive input (e.g., touch input or selection using an on screen pointer) to select one or more portions of the image. Further, the system may generate a prompt comprising a message indicating that a user may "TOUCH THE ONE OR MORE PORTIONS OF THE IMAGE THAT MAY BE DIFFERENT AFTER THE SECOND TIME."

At step 815, the system may receive an input that selects the one or more portions of the image. For example, the system may receive an input provided via a pointer (e.g., a pointer controlled by a trackpad) that selects a chin and eye portion of an image of a face associated with the biometric input received at the first time. A further example of receiving an input to select one or more portions of an image is depicted in FIG. 5 which is described herein.

At step 820, the system may determine that the indication of the one or more portions of the biometric input received at the first time that may be different after the second time is based on the input that selects the one or more portions of the image. For example, in response to receiving an input to select the chin and eye portion of an image of the face of the user associated with the biometric input, the system may determine that the chin and eye portion of the image of the face correspond to portions of the biometric input that are received at the first time that may be different after the second time.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The steps of the methods described herein are described as being performed in a particular order for the purposes of discussion. A person having ordinary skill in the art will understand that the steps of any methods discussed herein may be performed in any order and that any of the steps may be omitted, combined, and/or expanded without deviating from the scope of the present disclosure. Furthermore, the methods described herein may be performed using any manner of device, system, and/or apparatus including the computing devices, computing systems, and/or computing apparatuses that are described herein.

What is claimed is:

1. A computer-implemented method comprising:

generating, by a computing device, a first biometric signature based on a first biometric input received at a first time, wherein the first biometric signature indicates one or more biometric characteristics of a user;

comparing the first biometric signature with a first authenticated signature;

based the first biometric signature matching the first authenticated signature, receiving first user input comprising:

a time value indicating a second time, wherein the second time is a time on a future date; and an indication that indicates a type of biometric characteristics of the user is expected to become mismatched with the first authenticated signature after the second time;

based on the time value and before the second time:

causing display of, on a user interface, a prompt to select, from a plurality of types of biometric characteristics, the type of biometric characteristics that is expected to become mismatched at the second time;

receiving, in response to display of the prompt, second user input comprising a selection of the type of biometric characteristics that is expected to become mismatched at the second time; and generating, based on the selected type of biometric characteristics, a second authenticated signature by removing the selected type of biometric characteristics from the first authenticated signature;

at the second time indicated by the first user input, switching from the first authenticated signature to the second authenticated signature, wherein the selected type of biometric characteristics is removed from the second authenticated signature;

receiving a second biometric input after the second time, wherein the second biometric input comprises the selected type of biometric characteristics and at least one other type of biometric characteristics;

generating a second biometric signature based on the second biometric input, wherein the second biometric signature comprises the at least one other type of biometric characteristics and omits the selected type of biometric characteristics; and based on the second biometric signature matching the second authenticated signature, generating a third authenticated signature using the second biometric input; and authenticating, after the second time and based on the third authenticated signature, the user.

2. The method of claim 1, further comprising:

sending a notification to the user, wherein the notification is sent after the first time and before the second time, and wherein the notification indicates that the first biometric input received at the first time is not capable of being authenticatable after the second time.

3. The method of claim 1, further comprising:

receiving event data indicating an event associated with the second time.

4. The method of claim 3, wherein the event data is received from a calendar application of the user.

5. The method of claim 1, wherein the indication further indicates one or more changes to a geometry of a face associated with the one or more biometric characteristics of the first biometric input.

6. The method of claim 5, wherein the one or more changes to the geometry of the face comprise a nasal shape change, an eye shape change, a chin shape change, a cheek shape change, a hairline shape change, or a lip shape change.

7. The method of claim 1, wherein the first biometric input received at the first time and the second biometric input received at the second time each comprise a two-dimensional scan of a face, a three-dimensional scan of a face, a retinal scan, a fingerprint, or a handprint.

8. The method of claim 1, wherein causing the display of the prompt further comprising:

generating an image representing a face; and generating the prompt to select the type of biometric characteristics that is expected to become mismatched at the second time.

9. The method of claim 8, wherein the image comprises an indicator of a hair color, an indicator of a hair length, an indicator of an eye color, or an indicator of facial hair.

10. The method of claim 1, wherein the first biometric input received at the first time and the second biometric input received after the second time are received using the same type of biometric sensor.

11. A computing device, comprising:

one or more processors; and memory storing instructions that, when executed by the one or more processors, cause the computing device to:

generate a first biometric signature based on a first biometric input received at a first time, wherein the first biometric signature indicates one or more biometric characteristics of a user;

compare the first biometric signature with a first authenticated signature;

based on the first biometric signature matching the first authenticated signature, receive first user input comprising:

a time value indicating a second time, wherein the second time is a time on a future date; and an indication that indicates a type of biometric characteristics of the user is expected to become mismatched with the first authenticated signature after the second time;

based on the time value and before the second time:

cause display of, on a user interface, a prompt to select, from a plurality of types of biometric characteristics, the type of biometric characteristics that is expected to become mismatched at the second time;

receive, in response to display of the prompt, second user input comprising a selection of the type of biometric characteristics that is expected to become mismatched at the second time; and generate, before the second time and based on the indication, a second authenticated signature by removing the selected type of biometric characteristics from the first authenticated signature;

at the second time indicated by the first user input, switch from the first authenticated signature to the second authenticated signature, wherein the selected type of biometric characteristics is removed from the second authenticated signature;

receive a second biometric input after the second time, wherein the second biometric input comprises the selected type of biometric characteristics and at least one other type of biometric characteristics;

generate a second biometric signature based on the second biometric input, wherein the second biometric signature comprises the at least one other type of biometric characteristics and omits the selected type of biometric characteristics; and based on the second biometric signature matching the second authenticated signature, generate a third authenticated signature; and authenticate, after the second time and based on the third authenticated signature, the user.

12. The computing device of claim 11, wherein the instructions, when executed by the one or more processors, further cause the computing device to:

send a notification to the user, wherein the notification is sent after the first time and before the second time, and wherein the notification indicates that the first biometric input received at the first time is not capable of being authenticatable after the second time.

13. The computing device of claim 11, wherein the instructions, when executed by the one or more processors, further cause the computing device to:

receive event data indicating an event associated with the second time.

14. The computing device of claim 13, wherein the event data is received from a calendar application of the user.

15. The computing device of claim 11, wherein the indication further indicates one or more changes to a geometry of a face associated with the one or more biometric characteristics of the first biometric input.

16. A non-transitory machine-readable medium storing instructions that, when executed by one or more processors, cause the one or more processors to perform steps comprising:

generating a first biometric signature based on a first biometric input received at a first time, wherein the first biometric signature indicates one or more biometric characteristics of a user;

comparing the first biometric signature with a first authenticated signature;

based on the first biometric signature matching the first authenticated signature, receiving first user input comprising:

a time value indicating a second time, wherein the second time is a time on a future date; and an indication that indicates a type of biometric characteristics of the user is expected to become mismatched with the first authenticated signature after the second time;

based on the time value and before the second time:

causing display of, on a user interface, a prompt to select, from a plurality of types of biometric characteristics, the type of biometric characteristics that is expected to become mismatched at the second time;

receiving, in response to display of the prompt, second user input comprising a selection of the type of biometric characteristics that is expected to become mismatched at the second time; and generating, before the second time and based on the indication, a second authenticated signature by removing the selected type of biometric characteristics from the first authenticated signature;

at the second time indicated by the first user input, switching from the first authenticated signature to the second authenticated signature, wherein the selected type of biometric characteristics is removed from the second authenticated signature;

receiving a second biometric input after the second time, wherein the second biometric input comprises the selected type of biometric characteristics and at least one other type of biometric characteristics;

generating a second biometric signature based on the second biometric input, wherein the second biometric signature comprises the at least one other type of biometric characteristics and omits the selected type of biometric characteristics;

based on the second biometric signature matching the second authenticated signature, generating a third authenticated signature using the second biometric input; and authenticating, after the second time and based on the third authenticated signature, the user.

17. The non-transitory machine-readable medium of claim 16, wherein the instructions, when executed by the one or more processors, further cause the one or more processors to:

send a notification to the user, wherein the notification is sent after the first time and before the second time, and wherein the notification indicates that the first biometric input received at the first time is not capable of being authenticatable after the second time.

18. The non-transitory machine-readable medium of claim 16, wherein the instructions, when executed by the one or more processors, further cause the one or more processors to:

receive event data indicating an event associated with the second time.

19. The non-transitory machine-readable medium of claim 18, wherein the event data is received from a calendar application of the user.

20. The non-transitory machine-readable medium of claim 16, wherein the indication further indicates one or more changes to a geometry of a face associated with the one or more biometric characteristics of the first biometric input.

* * * * *